United States Patent
Itoh et al.

(10) Patent No.: US 6,576,208 B1
(45) Date of Patent: Jun. 10, 2003

(54) CATALYST FOR SELECTIVE OXIDATION AND ELIMINATION OF CARBON MONOXIDE PRESENT IN HYDROGEN-CONTAINING GASES

(75) Inventors: Takashi Itoh, Ichikawa (JP); Katsumi Kurabayashi, Ichikawa (JP); Takahiro Naka, Sakado (JP); Masako Takayama, Tokyo (JP); Osamu Usaka, Utsunomiya (JP); Shoji Isobe, Utsunomiya (JP)

(73) Assignees: N.E. Chemcat Corporation, Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/704,694

(22) Filed: Nov. 3, 2000

(30) Foreign Application Priority Data

Nov. 4, 1999 (JP) .............................. 11-314266

(51) Int. Cl.[7] .................. B01J 23/40; B01J 23/42; B01J 23/56; B01J 23/08; B01J 8/00
(52) U.S. Cl. .................. 423/247; 502/332; 502/355; 502/415; 502/439; 502/327; 423/437.2
(58) Field of Search ................. 502/327, 332, 502/355, 415, 439; 252/519.13, 514; 427/126.5; 423/247, 437.2

(56) References Cited

U.S. PATENT DOCUMENTS

| 2,747,970 A | 5/1956 | Rosenblatt |
| 3,631,073 A | 12/1971 | Cohn et al. |
| 3,923,646 A | * 12/1975 | Hiffman ............... 208/216 |
| 3,956,190 A | * 5/1976 | Sinfelt ................. 252/466 PT |

(List continued on next page.)

FOREIGN PATENT DOCUMENTS

| DE | 43 34 981 A1 | 4/1995 |
| DE | 43 34 983 A1 | 4/1995 |
| DE | 197 27 589 A1 | 1/1999 |
| EP | 0 743 694 A1 | 11/1996 |
| EP | 0 776 861 A1 | 6/1997 |
| EP | 0 941 963 A1 | 9/1999 |
| EP | 0 955 351 A1 | 11/1999 |
| GB | 846153 | 8/1960 |
| JP | 39-21742 | 10/1964 |
| JP | 8-295503 | 11/1996 |
| JP | 10-101302 | 4/1998 |

OTHER PUBLICATIONS

Patent Abstracts of Japan, 09-199156, Jul. 31, 1997.

McKee et al. "Electrocatalysts For Hydrogen/Carbon Monoxide Fuel Cell Anodes" "III. The Behavior of Supported Binary Noble Metals", "General Electric Research and Development Center, Schenectady, New York" vol. 6, No. 102–105.

*Primary Examiner*—Stanley S. Silverman
*Assistant Examiner*—Cam N. Nguyen
(74) *Attorney, Agent, or Firm*—Arent Fox Kintner Plotkin & Kahn

(57) ABSTRACT

A catalyst for selective oxidation of carbon monoxide present in a hydrogen-containing gas is provided in which the catalyst comprises ruthenium supported on an alumina hydrate. This catalyst has a high selective oxidation activity to carbon monoxide. A carbon monoxide elimination method using this catalyst is also provided. In this method, to a gas containing at least hydrogen and carbon monoxide and being richer in the hydrogen than the carbon monoxide on the basis of volume, oxygen is added in an amount necessary for oxidizing at least part of carbon monoxide present in that gas, and thereafter the gas to which the oxygen has been added is brought into contact with the catalyst described above. Also provided is a solid polymer electrolyte fuel cell system that utilizes this method.

21 Claims, 2 Drawing Sheets

U.S. PATENT DOCUMENTS

| | | | | |
|---|---|---|---|---|
| 3,972,837 A | * | 8/1976 | Acres et al. | 252/473 |
| 3,980,589 A | * | 9/1976 | Murrell et al. | 252/466 PT |
| 3,990,998 A | * | 11/1976 | DeLuca et al. | 252/466 PT |
| 4,012,337 A | * | 3/1977 | Mitchell, III | 252/439 |
| 4,036,784 A | * | 7/1977 | Gembicki et al. | 252/465 |
| 4,051,073 A | * | 9/1977 | Hegedus et al. | 252/466 PT |
| 4,066,740 A | * | 1/1978 | Erickson | 423/628 |
| 4,077,913 A | * | 3/1978 | Acres et al. | 252/462 |
| 4,124,537 A | * | 11/1978 | Gebicki et al. | 252/465 |
| 4,154,812 A | * | 5/1979 | Sanchez et al. | 423/626 |
| 4,175,056 A | * | 11/1979 | Antos | 252/441 |
| 4,189,405 A | * | 2/1980 | Knapton et al. | 252/462 |
| 4,206,087 A | * | 6/1980 | Keith et al. | 252/462 |
| 4,237,032 A | * | 12/1980 | Evans et al. | 252/462 |
| 4,284,531 A | * | 8/1981 | Simpson et al. | 252/465 |
| 4,340,579 A | * | 7/1982 | Greber et al. | 423/625 |
| 4,390,456 A | * | 6/1983 | Sanchez et al. | 252/448 |
| 4,447,556 A | * | 5/1984 | O'Hara et al. | 502/74 |
| 4,684,618 A | * | 8/1987 | Foley et al. | 502/313 |
| 4,756,822 A | * | 7/1988 | Chen et al. | 208/111 |
| 4,847,231 A | * | 7/1989 | Gratzel et al. | 502/74 |
| 4,910,180 A | * | 3/1990 | Berndt et al. | 502/304 |
| 4,943,549 A | * | 7/1990 | Immel et al. | 502/304 |
| 4,952,549 A | * | 8/1990 | Immel et al. | 502/330 |
| 5,023,226 A | * | 6/1991 | Immel et al. | 502/313 |
| 5,248,566 A | | 9/1993 | Kumar et al. | |
| 5,773,657 A | * | 6/1998 | Rutter et al. | 564/450 |
| 5,874,652 A | * | 2/1999 | Pitchai et al. | 568/862 |
| 5,908,607 A | * | 6/1999 | Abekawa et al. | 423/502 |
| 5,962,124 A | * | 10/1999 | Yoshino et al. | 428/328 |
| 6,262,132 B1 | * | 7/2001 | Singleton et al. | 518/715 |
| 6,399,035 B1 | * | 6/2002 | Tabata et al. | 423/213.5 |
| 6,403,844 B1 | * | 6/2002 | Zhang et al. | 568/864 |

* cited by examiner

CATALYST FOR SELECTIVE OXIDATION AND ELIMINATION OF CARBON MONOXIDE PRESENT IN HYDROGEN-CONTAINING GASES

BACKGROUND OF THE INVENTION

1. Field of the Invention

This invention relates to a catalyst capable of selectively oxidizing carbon monoxide present in hydrogen-containing gases fed to the anode of a solid polymer electrolyte fuel cell, a method for eliminating carbon monoxide by using such a catalyst, and a solid polymer electrolyte fuel cell system using the catalyst.

2. Description of the Prior Art

Solid polymer electrolyte fuel cells have a high output density, are drivable at a low temperature and may emit little exhaust gases which contain injurious materials, and hence attract notice as a transport means energy source that can substitute for conventional internal combustion engines.

In fuel cells, hydrogen gas or a fuel gas containing hydrogen is fed to a fuel electrode (the anode) and air or oxygen-containing gas to an oxidizer electrode (the cathode), where hydrogen is oxidized as shown by the following equations, to generate electricity.

Anodic reaction:

$$H_2 \rightarrow 2H^+ + 2e-$$

Cathodic reaction (in the case of hydrogen):

$$1/2 O_2 + 2H^+ + 2e^- \rightarrow H_2O$$

Overall reaction (in the case of hydrogen):

$$H_2 + 1/2 O_2 \rightarrow H_2O$$

On the anode and cathode, electrode catalysts are used in order to accelerate the respective electrode reactions. Electrode catalysts conventionally used include those comprised of platinum alone or combination of platinum with at least one selected from palladium, rhodium, iridium, ruthenium, osmium and gold, or combination of platinum with at least one selected from base metals such as tungsten, chromium, manganese, iron, cobalt, nickel and copper, which are used in the form of metal powders or alloy powders. Also, those comprised of any of these metal powders or alloy powders supported on conductive carbon particles have been used.

In fuel cells, hydrogen-enriched gases are commonly used which are obtained by previously reforming a fuel, e.g., an alcohol or hydrocarbon by means of a reformer. However, on electrodes of solid polymer electrolyte fuel cells drivable (operable) at a temperature of 120° C. or below, carbon monoxide present in such hydrogen-enriched gases may poison the platinum contained in the anode electrode catalyst to cause polarization greatly, resulting in a decrease in output. In order to prevent this, it has been proposed to use the platinum contained in the anode electrode catalyst, in the form of its alloy with rhodium, iridium, ruthenium or the like (D. W. Mckee and A. J. Scarpellio Jr., J. Electrochem. Tech., 6 (1969), p.101). However, even this method has its limitations for improving anti-CO-poisoning performance of the anode electrode catalyst. Anode polarization caused by being poisoned with carbon monoxide may greatly occur when the carbon monoxide in the hydrogen-enriched gas is in a concentration higher than 100 ppm.

Reformed gases obtained by subjecting oxygen-containing hydrocarbons such as methanol or hydrocarbons such as gasoline and methane to steam reforming, autothermal reforming or partial-oxidation reforming in the presence of water and/or air also contain carbon monoxide in a proportion of a few % to tens of %. This carbon monoxide is converted into hydrogen and carbon dioxide by allowing it to react with water by means of a water-gas shift reactor installed in a reformer or at the latter stage of the reformer. Such water-gas shift reaction, however, is an equilibrium reaction, and a reverse shift reaction which forms carbon monoxide and water from hydrogen and carbon dioxide may take place depending on reaction temperature. Hence, gases at the outlet (outlet gases) of the water-gas shift reactor usually contain, in addition to the chief components hydrogen and carbon dioxide, thousands of ppm to 1% of carbon monoxide and, in some cases, nitrogen. In order to keep the anode electrode catalyst of the solid polymer electrolyte fuel cell from being poisoned with carbon monoxide, concentration of this carbon monoxide must be lowered to 100 ppm or less, and preferably 50 ppm or less.

U.S. Pat. No. 5,248,566 discloses a method of selective oxidation in which, in order to lower the concentration of carbon monoxide, air which contains oxygen in an amount substantially equimolar to the carbon monoxide present in the outlet gases of the water-gas shift reactor is added to that outlet gases and the gas thus formed is brought into contact with a catalyst of rhodium/ruthenium supported on alumina to selectively oxidize the carbon monoxide without oxidizing the hydrogen in gases. As catalysts for selective oxidation of carbon monoxide present in hydrogen gas, catalysts comprised of a noble metal such as platinum, rhodium or ruthenium supported on a metal oxide such as alumina and silica are known as those for purifying hydrogen used for the synthesis of ammonia (Japanese Post-examination Publication (Kokoku) No. 39-21742). Recently, besides the catalyst disclosed in the above U.S. Pat. No. 5,248,566, also disclosed in the field of fuel cells for automobiles are a catalyst of ruthenium supported on titania (Japanese Laid-open Publication (Kokai) No. 8-295503) and a catalyst of ruthenium supported on zirconia (Japanese Laid-open Publication (Kokai) No. 10-101302).

However, such conventional catalysts for selective oxidation of carbon monoxide have insufficient activity and selectivity, and have had to be more improved in performance. In the case of fuel cells for automobiles, in order to mount a carbon monoxide selective-oxidation reactor on a car in its limited space, a catalyst is necessary which is as small as possible and yet exhibits a high carbon monoxide elimination rate. In the above conventional catalysts, an attempt to achieve a high carbon monoxide elimination rate has resulted in too large a size for the catalyst, and an attempt to make the catalyst small an insufficient carbon monoxide elimination rate. Moreover, in the conventional catalysts, their carbon monoxide oxidation activity is inhibited by the water contained in reformed gases or by oxygen-containing hydrocarbons and hydrocarbons remaining in a trace quantity. Thus, even if they can exhibit a high activity to any simulated gases containing only hydrogen carbon monoxide and oxygen, they have absolutely insufficient activity to actual reformed gases.

SUMMARY OF THE INVENTION

The present invention was made in order to solve the above problems the prior art have. Accordingly, an object of the present invention is to provide a catalyst for selective oxidation of carbon monoxide present in hydrogen-containing gases, and a method for eliminating carbon monoxide and a solid polymer electrolyte fuel cell system which make use of such a catalyst.

To achieve the above object, firstly the present invention provides a catalyst for selective oxidation of carbon monoxide present in hydrogen-containing gases; the catalyst comprising ruthenium supported on an alumina hydrate.

Secondly the present invention also provides a method for eliminating carbon monoxide present in hydrogen-containing gases, comprising the steps of:

adding to a gas containing at least hydrogen and carbon monoxide and being richer in the hydrogen than the carbon monoxide on the basis of volume, oxygen in an amount necessary for oxidizing at least part of carbon monoxide present in that gas; and subsequently bringing the gas to which the oxygen has been added, into contact with the above catalyst for selective oxidation of carbon monoxide.

Thirdly the present invention still also provides a solid polymer electrolyte fuel cell system comprising a fuel storage container, a reformer, a shift reactor, a carbon monoxide selective-oxidation reactor using the above catalyst of the present invention, and a solid polymer electrolyte fuel cell which are disposed in this order.

The catalyst of the present invention which comprises ruthenium supported on an alumina hydrate has a superior selective-oxidation activity to carbon monoxide present in hydrogen-containing gases. Hence, the carbon monoxide selective-oxidation reactor using the catalyst of the present invention can be made light-weight and small. Also, because of the use of the catalyst of the present invention, gases having a low carbon monoxide concentration can be fed to the latter stage fuel cell, and hence the anode electrode catalyst of the fuel cell can be kept from being poisoned with carbon monoxide and the anode electrode catalyst can enjoy a long lifetime.

The solid polymer electrolyte fuel cell system using the catalyst of the present invention is useful as a fuel cell system for automobiles.

BRIEF DESCRIPTION OF THE DRAWINGS

In the accompanying drawings.

DETAILED DESCRIPTION OF THE PREFERRED EMBODIMENTS

Figure 1:
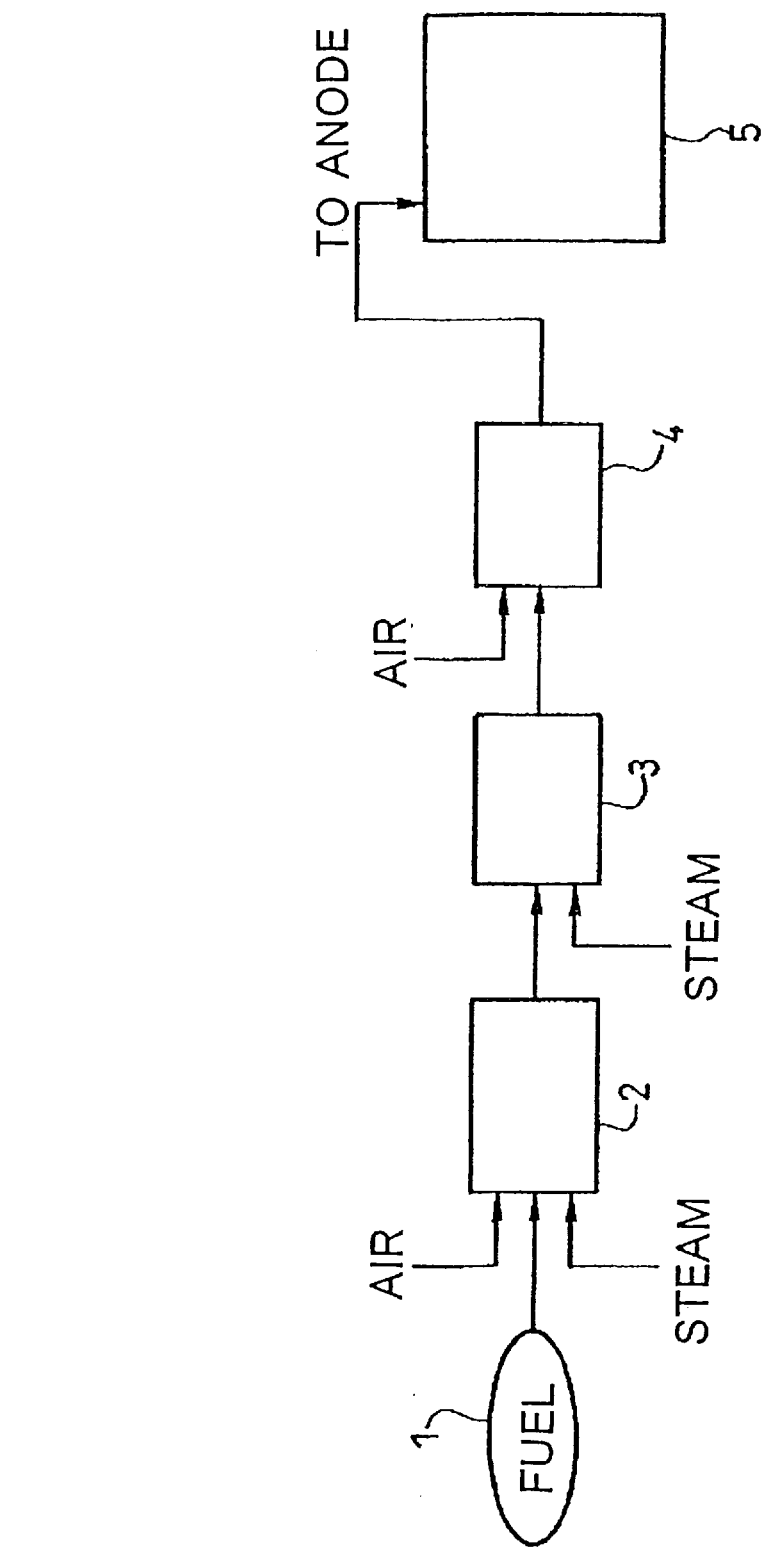
FIG. 1 illustrates the construction of the solid polymer electrolyte fuel cell system according to the present invention.

The present invention will be described below in detail and in order.

Carbon Monoxide Selective-oxidation Catalyst

The catalyst of the present invention comprises ruthenium supported on an alumina hydrate.

The alumina hydrate used as a carrier includes compounds represented by the chemical formula: $Al_2O_3 \cdot nH_2O$ wherein n is an integer of 1 to 3, which are produced in the course where aluminum hydroxide is dehydrated by firing to converted into alumina.

Compounds wherein n is 3 may include, e.g., bayerite, gibbsite and nordstrandite. As compounds wherein n is 2, none of those having clear crystal forms are known in the art, and they may include compounds in gel states. Compounds wherein n is 1 may include, e.g., diaspore and boehmite. Of these compounds, any one of boehmite, boehmite gel and pseudo-boehmite or a mixture of two or more of these may preferably be used.

The alumina hydrate used in the present invention may preferably have a BET specific surface area of, but not particularly limited to, 150 $m^2/g$ or larger, and more preferably 200 $m^2/g$ or larger. In practical use, it may be 200 to 400 $m^2/g$.

The starting material, alumina hydrate, can be obtained by conventionally known methods such as neutralization of aluminum sulfate and hydrolysis of aluminum alkoxides. It may preferably be obtained by hydrolysis of aluminum alkoxides, which can provide alumina hydrates containing no impurity and having a large BET specific surface area.

The catalyst of the present invention comprises ruthenium (Ru) supported on the alumina hydrate. There are no particular limitations on the status of the ruthenium supported. It may preferably be present in the state of metal, or the state of a low-valency oxide such as $RuO$, $Ru_2O_3$ or $RuO_2$, or of $Ru(OH)_3$. Two or more of any of these may be present in the form of a mixture. Of these, the state of metal is particularly preferred.

The ruthenium may preferably be supported in an amount of, but not particularly limited to, from 0.1 to 20% by mass, and more preferably from 0.5 to 10% by mass in terms of metallic ruthenium, based on the mass of the catalyst.

There are no particular limitations on how to prepare the catalyst of the present invention. Any common methods such as impregnation, water absorption and evaporation to dryness may be used. For example, the catalyst may be prepared by adding a solution or suspension of a starting ruthenium compound to a carrier powder, followed by evaporation to dryness, thereafter insolubilization with an acid or alkali and further followed by reduction treatment to activate the supported component.

The ruthenium compound used as the starting material may include, e.g., ruthenium oxide; ruthenium hydroxide; ruthenium halides such as ruthenium chloride, ruthenium bromide and ruthenium iodide; halogeno-acids such as chlororuthenic acid, bromoruthenic acid and iodoruthenic acid; oxy acids such as ruthenic acid; alkali metal salts or ammonium salts of chlororuthenic acid or ruthenic acid, such as sodium chlororuthenate and sodium ruthenate; ruthenium salts of inorganic acids, such as ruthenium nitrosyl nitrate and ruthenium sulfate; ruthenium salts of inorganic acids, such as ruthenium nitrosyl nitrate and ruthenium sulfate; and coordination complexes such as tetrammine ruthenium halides.

Insolubilization which is carried out after any of these compounds have been supported on the carrier powder may also be done by common methods. In the case when the ruthenium compound is an acidic ruthenium compound, it may be treated with a base and, in the case when it is a basic ruthenium compound, it may be treated with an acid, to effect neutralization and precipitation.

Then, as methods for the reduction treatment for activating the supported component insolubilized on the carrier powder, usable are a method of wet reduction which makes treatment with a reducing agent such as formic acid, formalin or hydrazine and a method of gaseous phase reduction which makes treatment in a stream containing hydrogen.

In the case when the wet reduction is used, the treatment may be made at a temperature of usually from room temperature to 100° C., and for a time of usually from 10 minutes to 24 hours, and preferably from 30 minutes to 4 hours. In the case when the gaseous phase reduction is used, the hydrogen content in the gas may be, but no limited to, 5 to 20% by volume (the remainder is nitrogen). Such a gas may preferably be used. The treatment may be made at a temperature of usually from room temperature to 400° C., and preferably from 100 to 250° C., and for a time of usually from 10 minutes to 4 hours, and preferably from 30 minutes to 2 hours.

The catalyst on which the reduction treatment has been made may be used as it is, or may preferably be used after washing. Washing enables elimination of unwanted decomposition products of ruthenium compounds and decomposition products of reducing agents.

The catalyst of the present invention may preferably be treated at temperatures not higher than 400° C., and more preferably not higher than 250° C., throughout its production process. If it is treated at temperatures higher than 400° C., the carrier alumina hydrate may transform into a transition alumina of $\gamma$, $\delta$, $\eta$, $\theta$, $\kappa$ or $\chi$ form. If it is treated further at temperatures higher than 900° C., the alumina hydrate may transform into $\alpha$-alumina undesirably.

The form to be taken when the catalyst of the present invention is used may include, but not particularly limited to; e.g., a form where a given space stands filled with the catalyst, and a form where the catalyst stands molded into a given shape. In the case when it is molded into a stated shape, the catalyst may be molded after it is mixed with a suitable binder, or without any binder. The carrier may previously be molded into a stated shape before the treatment to support the ruthenium compound is made. The shape into which the catalyst is molded may include, but not particularly limited to, the shapes of a ball, a pellet, a cylinder, a honeycomb, a spiral, granules and a ring. The shape and size may appropriately be selected in accordance with use conditions.

Alternatively, the catalyst may be coated on the surface of a monolithic supporting substrate to make up a catalyst-coated structure. Such a monolithic supporting substrate may include, e.g., ceramics such as cordierite and mullite, and metals such as stainless steel, Inconel and Hastelloy integrally molded into the form of honeycombs, foams or corrugated laminates.

The supporting substrates include a monolithic supporting substrate provided inside or outside thereof with a heating medium flow channel for controlling reaction temperature which is partitioned from a gas flow channel also provided for supporting substrate by a gas-impermeable wall.

In production of the catalyst-coated structure, the surface of the supporting substrate may be coated with the catalyst of the present invention together with a suitable binder, or without any binder, by a method such as wash coating. Alternatively, only the carrier may first be coated on the supporting substrate and then the ruthenium compound may be supported thereon to make up the catalyst-coated structure.

As the binder, usable are common binders as exemplified by alumina sol, silica sol, aluminum nitrate and aluminum acetate.

Carbon Monoxide by Elimination Selective-oxidation

The method for eliminating carbon monoxide by using the catalyst of the present invention will now be described.

This method for eliminating carbon monoxide (CO), comprises adding to a gas containing at least $H_2$ and CO and being richer in the $H_2$ than the CO on the basis of volume, oxygen in an amount necessary for oxidizing at least part of CO present in that gas, and subsequently bringing the resultant gas into contact with the catalyst of the present invention to selectively oxidize only the CO substantially without oxidizing $H_2$. This method is applied to the gas led out of a shift reactor in, e.g., a solid polymer electrolyte fuel cell system described later.

The oxygen added in this method is usually added as air. In order to oxidize CO, it is advantageous to enhance oxygen concentration, but any excess oxygen also oxidizes $H_2$. In order to achieve a high CO elimination rate and improve a hydrogen recovery that is defined by the equation below, the ratio of $O_2$ to CO, $O_2/CO$ (molar ratio), may preferably be set to be from 0.5 to 2.5, and more preferably from 0.7 to 1.5, when the gas is brought into contact with the catalyst.

Hydrogen recovery (%)=(dry-conversion hydrogen concentration in CO selective-oxidation reactor outlet gas)/(dry-conversion hydrogen concentration in the same reactor inlet gas)×100

The gas may preferably be brought into contact with the catalyst at a temperature of from 60 to 220° C., and more preferably from 100 to 170° C. The gas may usually be flowed at a gas hourly space velocity (GHSV) of from 5,000 to 150,000/hr, and preferably from 10,000 to 100,000/hr.

According to the elimination method of the present invention, the CO concentration in the gas can be lowered to 100 ppm or less, and, as occasion calls, to 50 ppm or less and further to 30 ppm or less, and also a hydrogen recovery of as high as 98% or more can be attained.

A higher CO elimination rate than in conventional methods can also be attained even when a few % of any unreformed components, e.g., hydrocarbons such as methane and oxygen-containing hydrocarbons such as methanol are contained in a gas to be treated together with 20 to 30% of $H_2O$ or $CO_2$ and $N_2$.

Solid Polymer Electrolyte Fuel Cell System

The solid polymer electrolyte fuel cell system using the catalyst of the present invention will now be described with reference to FIG. 1.

The solid polymer electrolyte fuel cell system of the present invention comprises a storage container 1 for a fuel comprised of hydrocarbons and/or oxygen-containing hydrocarbons, a reformer 2 in which the fuel and water and further optionally air are fed and brought into contact with a reforming catalyst to form $H_2$, CO and CO2, a shift reactor 3 in which steam (water vapor) is added to the reformed gas formed in the reformer 2 and the resultant gas is brought into contact with a catalyst to lower the CO concentration to 2% by volume or less, a carbon monoxide selective-oxidation reactor 4 in which air is added in a given quantity to the gas formed in the shift reactor 3 and the resultant gas is brought into contact with the catalyst according to the present invention to lower the CO concentration to 100 ppm or less, and a solid polymer electrolyte fuel cell 5.

Some of these constituent units may be combined or any other constituent units may be added to set up the system of the present invention. For example, when methanol is used as the fuel, the shift reactor 3 may be incorporated in the reformer 2 to provide one integral unit. Since 10 to 20% of $H_2$ remains in the anode exhaust gas of the solid polymer electrolyte fuel cell 5, the constituent units of the present invention may further be provided with a catalytic-combustion unit (not shown), where the anode exhaust gas and air are introduced into the catalytic-combustion unit, and the remaining hydrogen is combusted so that its combustion heat can be utilized for, e.g., the vaporization of the fuel methanol.

The solid polymer electrolyte fuel cell system of the present invention employs in the carbon monoxide selective-oxidation reactor 4 the catalyst of the present invention, having a superior CO selective-oxidation activity, and hence the catalyst and the carbon monoxide selective-oxidation reactor can be made light-weighter and smaller, and also a gas with a low CO concentration can be fed to the latter stage fuel cell 5. This enables the anode electrode catalyst to be kept from being poisoned with carbon monoxide and enables the anode electrode catalyst to enjoy a long lifetime.

EXAMPLES

The present invention will be described below in greater detail with reference to Examples. The present invention is by no means limited to these Examples. In the following Examples and Comparative Examples, "%" refers to "% by mass" unless otherwise noted.

Example 1

Figure 2A:
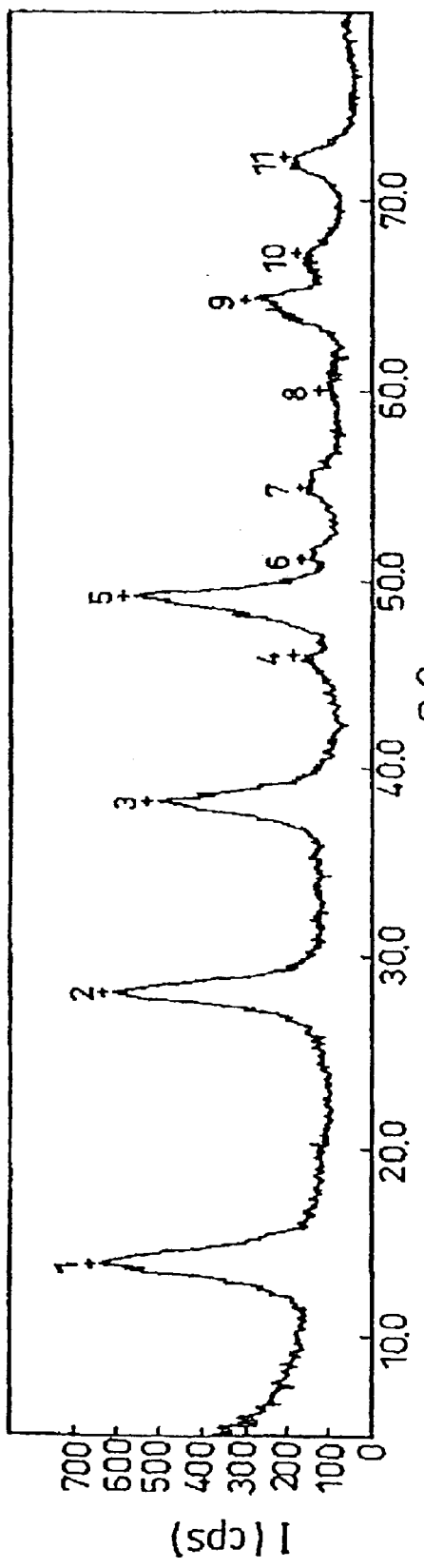
FIG. 2A is a diffraction pattern of a catalyst powder of Example 1, measured by powder X-ray diffraction.

6.3 kg of alumina hydrate powder (available from Kondea K.K.; trade name: PURAL SB) having a BET specific surface area of 310 $m^2/g$ was put in a quartz tray, and was fired at 400° C. for 1 hour in the air in an electric furnace. The powder having been thus fired had a BET specific surface area of 210 $m^2/g$, and X-ray powder diffractometry identified it to be boehmite. To 235.2 g of this powder, 2.0 L of deionized water was added, and these were mixed to form a slurry. To this slurry, 200 mL of an aqueous ruthenium chloride solution containing 4.8 g of ruthenium was added, and the mixture obtained was transferred to an evaporating dish, followed by heating for 5 to 6 hours to effect evaporation to dryness. The solid matter thus obtained was dried at 120° C. for 16 hours, followed by pulverization. The pulverized product obtained was added little by little to 3.2 L of an aqueous solution containing 9.5 g of sodium hydroxide, and these were stirred at room temperature for 4 hours. Thereafter, 166 mL of an aqueous solution containing 14.8 mL of hydrazine hydrate with a 80% of water hold was dropwise added over a period of 30 minutes, further followed by stirring at room temperature for 4 hours. The resultant slurry was filtered, and the filtrate obtained was washed until the washed filtrate had a pH of 6.5 to 7.5 and an electrical conductivity of 5 $\mu$s/cm or lower and chlorine ions had disappeared. The solid matter thus obtained was dried at 120° C. for 16 hours to obtain 240 g of an alumina hydrate-supported Ru (2%) catalyst powder (A-1). Measurement of this powder by powder X-ray diffraction revealed a diffraction pattern specific to boehmite, having peaks at $2\theta=14.2°$, 28.1°, 38.0° and 49.1° as shown in FIG. 2A.

Example 2

240 g of the same alumina hydrate powder having been fired as that used in Example 1 was put in a mixer, to which 200 mL of an aqueous ruthenium chloride solution containing 12.0 g of ruthenium was added with stirring over 20 minutes, followed by drying at 120° C. for 16 hours, and then pulverization. The pulverized product thus obtained was added little by little to 7.8 L of an aqueous solution containing 23.8 g of sodium hydroxide, and these were stirred at room temperature for 4 hours to obtain a slurry. Then, this slurry was filtered, and thereafter the filtrate obtained was washed until the washed filtrate had a pH of 6.5 to 7.5 and an electrical conductivity of 5 $\mu$s/cm or lower and chlorine ions had disappeared. The solid matter thus obtained was dried at 120° C. for 16 hours, followed by pulverization. Thereafter, the pulverized product obtained was put in a quartz tray, and was reduced at 200° C. for 1 hour in a quartz-sheathed hydrogen reducing furnace while flowing a mixed gas of 5% by volume of hydrogen and the remainder nitrogen, to obtain 240 g of an alumina hydrate-supported Ru(5%) catalyst powder (A-2).

Example 3

The same alumina hydrate powder as that used in Example 1 was put in a quartz tray, and was fired at 300° C. for 1 hour in the air in an electric furnace. The powder having been thus fired had a BET specific surface area of 240 $m^2/g$, and measurement by powder X-ray diffraction identified it to be boehmite. To 216 g of this powder, 2.0 L of deionized water was added, and these were mixed to form a slurry. To this slurry, 200 mL of an aqueous ruthenium chloride solution containing 24.0 g of ruthenium was added, and the mixture obtained was moved to an evaporating dish, followed by heating for 5 to 6 hours to effect evaporation to dryness. The solid matter thus obtained was dried at 120° C. for 16 hours, followed by pulverization. The pulverized product thus obtained was put in a quartz tray, and was reduced at 200° C. for 1 hour in a quartz-sheathed hydrogen reducing furnace while flowing a mixed gas of 5% by volume of hydrogen and the remainder nitrogen. Next, this powder obtained by reduction treatment was added to an aqueous 0.5% sodium hydroxide solution, and these were stirred at room temperature for 4 hours to obtain a slurry. Then, this slurry was filtered, and thereafter the filtrate obtained was washed until the washed filtrate had a pH of 6.5 to 7.5 and an electrical conductivity of 5 $\mu$s/cm or lower and chlorine ions had disappeared. The solid matter thus obtained was dried at 120° C. for 16 hours to obtain 240 g of an alumina hydrate-supported Ru(10%) catalyst powder (A-3).

Example 4

200 g of the catalyst powder (A-2) obtained in Example 2, 100 g of alumina sol (alumina content: 20%), 250 g of deionized water and 500 mL of magnetic balls were put in a magnetic-ball mill pot and were water-pulverized for 6 hours to obtain a slurry. Next, a honeycomb of 2.54 cm diameter and 3 cm long extracted from a commercially available honeycomb made of cordierite (cell density: 400 cells/$in^2$) was immersed in the slurry, and then drawn up. Excess slurry was removed with an air knife, followed by drying at 200° C. for 4 hours. This immersion-drying procedure was further repeated three times while adjusting slurry concentration, to obtain a honeycomb catalyst (H-1) having a catalyst coverage of 100 g/L per honeycomb unit volume.

Example 5

A commercially available honeycomb made of aluminum-containing stainless steel (cell density: 400 cells/$in^2$) of 2.5 cm diameter and 6 cm long was boiled twice with 98° C. deionized water, followed by drying at 120° C. for 4 hours. This honeycomb was immersed in alumina sol (alumina: 20%), and then drawn up. Excess slurry was removed with an air knife, followed by drying at 200° C. for 4 hours, and further followed by baking at 400° C. for 30 minutes in the air in an electric furnace to obtain an alumina-deposited honeycomb having an alumina coverage of 20 g/L per honeycomb unit volume. Then the procedure of Example 4 was repeated except for using this alumina-deposited honeycomb and 200 g of the catalyst powder (A-1) obtained in Example 1, to obtain a honeycomb catalyst (H-2) having a catalyst coverage of 200 g/L per honeycomb unit volume.

Example 6

The procedure of Example 5 was repeated except for using the catalyst powder (A-3) obtained in Example 3, to obtain a honeycomb catalyst (H-3) having a catalyst coverage of 100 g/L per honeycomb unit volume.

Comparative Example 1

Figure 2B:
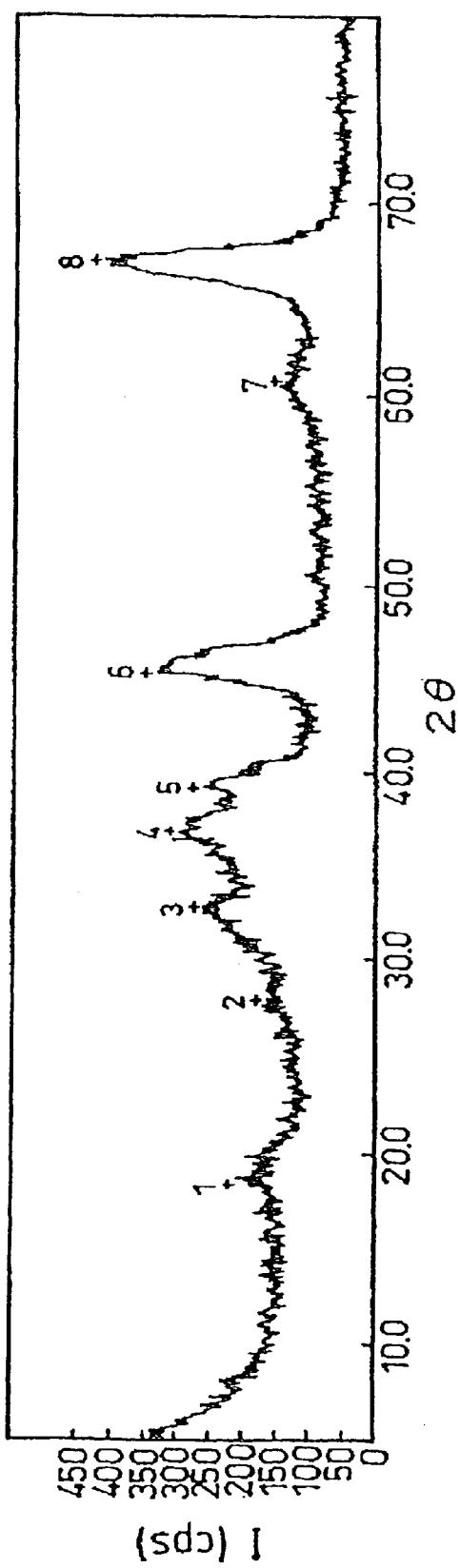
FIG. 2B is a diffraction pattern of a catalyst powder of Comparative Example 1, measured by powder X-ray diffraction.

240 g of an alumina-supported Ru(5%) catalyst powder was obtained in the same manner as in Example 2 except that the alumina hydrate used therein was replaced with 228 g of a commercially available activated-alumina powder having a BET specific surface area of 150 m$^2$/g. Measurement of this powder by powder X-ray diffraction revealed an X-ray diffraction pattern due to γ-alumina or χ-alumina, having peaks at 2θ=45.4° and 67.0° as shown in FIG. 2B. A honeycomb catalyst (C-1) was obtained in the same manner as in Example 4 except for using this catalyst powder.

Comparative Example 2

240 g of an alumina-supported Ru(5%) catalyst powder was obtained in the same manner as in Example 2 except that the alumina hydrate used therein was replaced with 228 g of a powder of 200 μm or smaller in particle diameter which was obtained by pulverizing activated-alumina balls (available from Sumitomo Chemical Co., Ltd.; trade name: NKHD) having a BET specific surface area of 340 m$^2$/g, in a mortar followed by sieving. Measurement of this powder by powder X-ray diffraction revealed an X-ray diffraction pattern due to γ-alumina, having peaks at 2θ=45.4° and 66.8°. A honeycomb catalyst (C-2) was obtained in the same manner as in Example 4 except for using this catalyst powder.

Comparative Example 3

240 g of an alumina-supported Ru(5%) catalyst powder was obtained in the same manner as in Example 2 except that the alumina hydrate used therein was replaced with an anatase type titania powder (available from Ishihara Sangyo Kaisha, Ltd.; trade name: MC-90) having a BET specific surface area of 90 m$^2$/g. A honeycomb catalyst (C-3) was obtained in the same manner as in Example 4 except for using this catalyst powder.

Comparative Example 4

240 g of a zirconia-supported Ru(5%) catalyst powder was obtained in the same manner as in Example 2 except that the alumina hydrate used therein was replaced with a zirconia powder (available from Shin Nippon Kinzoku Kagaku Co., Ltd.; trade name: ZrO$_2$-C) having a BET specific surface area of 90 m$^2$/g. A honeycomb catalyst (C-4) was obtained in the same manner as in Example 4 except for using this catalyst powder.

Performance Evaluation Examples

With regard to the honeycomb catalyst H-3 obtained in Example 6, its activity for selective oxidation of carbon monoxide present in hydrogen-containing gases was evaluated in the following way.

A heat insulation material was wound around the periphery of the honeycomb catalyst H-3, and this was loaded into a reaction tube of 27 mm in inner diameter made of quartz.

H$_2$ gas, CO$_2$ gas, CO and steam were mixed at flow rates of 9.75 L/minute, 3 L/minute, 150 mL/minute and 1,350 mL/minute, respectively, in terms of S.T.P. (standard temperature and standard pressure) (the same applies hereinafter) to prepare a simulated reformed gas.

A simulated reformed gas was also prepared which was comprised of 150 mL/minute of O$_2$ and 600 mL/minute of N$_2$. This gas was added to the simulated reformed gas to prepare a feed gas. Feed rate of the feed gas to the reaction tube was set at 15 L/minute.

Prior to performance evaluation, a gas obtained by removing CO$_2$ and CO from the above feed gas was heated in an infrared image oven and fed to the reaction tube, during which the honeycomb catalyst inlet gas temperature was kept at 300° C. for 20 minutes and then dropped to 80° C. over a period of 20 minutes to make pretreatment of the honeycomb catalyst. Next, the above feed gas, heated in an infrared image oven, was fed to the reaction tube at a gas hourly space velocity (GHSV) of 60,000/hr, and the honeycomb catalyst inlet gas temperature was continuously raised from 80° C. to 300° C. at a rate of 10° C./minute, during which the CO in the honeycomb catalyst inlet gas was continuously measured with a CO concentration meter. Used as the CO concentration meter was a high-concentration hydrogen adapted type meter (manufactured by Besuto Sokki K.K.; trade name: BEX2201E) having been made free of any interference due to high-concentration hydrogen. Honeycomb catalyst outlet gas was also collected to measure H$_2$ concentration by TCD gas chromatography. Within the range of honeycomb catalyst inlet gas temperatures of 110 to 160° C., the dry-matter CO concentration at the honeycomb catalyst outlet was 10 ppm shown as the minimum value and the hydrogen recovery was 99%.

Next, a test was made under the same evaluation conditions as the above except for using a feed gas obtained by adding gaseous methanol to the simulated reformed gas at a rate of 100 mL/minute. Within the range of honeycomb catalyst inlet gas temperatures of 110 to 160° C., the dry-matter CO concentration at the honeycomb catalyst outlet was 13 ppm shown as the minimum value and the hydrogen recovery was 99%.

The comparative honeycomb catalyst C-1 was tested under the same evaluation conditions as the above. In the case when the methanol was not added, within the range of honeycomb catalyst inlet gas temperatures of 120 to 170° C., the dry-matter CO concentration at the honeycomb catalyst outlet was 100 ppm shown as the minimum value and the hydrogen recovery was 97%. In the case when the methanol was added, within the range of honeycomb catalyst inlet gas temperatures of 120 to 170° C., the dry-matter CO concentration at the honeycomb catalyst outlet was 480 ppm shown as the minimum value and the hydrogen recovery was 95%.

The honeycomb catalysts H-1, H-2, C-3 and C-4 were also tested under the same evaluation conditions as the above. The minimum values of the dry-matter CO concentration at the honeycomb catalyst outlet are shown in Table

TABLE 1

| Honeycomb catalyst | Honeycomb catalyst outlet CO concentration (ppm) | |
| --- | --- | --- |
| | Methanol not added | Methanol added |
| H-1 | 25 | 28 |
| H-2 | 20 | 23 |
| H-3 | 10 | 13 |
| C-1 | 100 | 480 |
| C-2 | 120 | 140 |
| C-3 | 70 | 230 |
| C-4 | 50 | 180 |

As can be seen from Table 1, in the case when the methanol is not added, the catalysts of the present invention which make use of the alumina hydrate as the carrier show superior CO selective oxidation activity compared with the comparative catalyst using alumina, titania or zirconia as the carrier. Also, in the case when the methanol is added, the catalysts of the present invention is little affected by it in respect of the CO selective oxidation activity. On the other hand, the catalysts of Comparative Examples result in a greatly low CO selective oxidation activity because of the addition of methanol.

Thus, the catalysts of the present invention have a superior performance on the activity for selective oxidation of carbon monoxide present in hydrogen-containing gases.

What is claimed is:

1. A catalyst for selective oxidation of carbon monoxide present in hydrogen-containing gases, the catalyst comprising a ruthenium component supported on an alumina hydrate, said ruthenium component comprising ruthenium in the state of metal.

2. The catalyst according to claim 1, which has a BET specific surface area of 150 m$^2$ or larger.

3. The catalyst according to claim 1, which has a BET specific surface area of 200 m$^2$ or larger.

4. The catalyst according to claim 1, wherein said alumina hydrate is a compound represented by the chemical formula: $Al_2O_3 \cdot nH_2O$ wherein n is an integer of 1 to 3.

5. The catalyst according to claim 1, wherein said alumina hydrate is at least one member selected from the group consisting of boehmite, pseudo-boehmite and boehmite gel.

6. The catalyst according to claim 1, wherein said ruthenium is present in an amount of from 0.1 to 20% by mass in terms of metallic ruthenium based on the mass of the catalyst.

7. The catalyst according to claim 1, wherein said ruthenium is present in an amount of from 0.5 to 10% by mass based on the mass of the catalyst in terms of metallic ruthenium.

8. The catalyst according to claim 1, which has been molded into a predetermined form.

9. The catalyst according to claim 8, Wherein said predetermined form is a ball, a pellet, a cylinder, a honeycomb, a spiral, a granule, or a ring.

10. The catalyst according to claim 1, wherein said alumina hydrate has been molded into a predetermined form and said ruthenium is supported on the molded alumina hydrate.

11. The catalyst according to claim 10, wherein said predetermined form is a ball, a pellet, a cylinder, a honeycomb, a spiral, a granule, or a ring.

12. The catalyst according to claim 1, wherein said ruthenium component further comprises $RuO$, $Ru_2O_3$, $RuO_2$, $Ru(OH)_3$ or mixtures thereof.

13. A catalyst-coated structure for selective oxidation of carbon monoxide present in hydrogen-containing gases, wherein the structure comprising a monolithic supporting substrate and the catalyst according to claim 1, coated on the substrate.

14. The catalyst-coated structure according to claim 13, wherein said monolithic supporting substrate comprises a ceramic or a metal.

15. A method for eliminating carbon monoxide present in hydrogen-containing gases, comprising the steps of:

adding to a gas containing hydrogen and carbon monoxide, wherein the gas contains higher hydrogen concentration than carbon monoxide on the volume basis, an amount of oxygen sufficient for oxidizing at least part of carbon monoxide present in said gas; and subsequently bringing the gas to which the oxygen has been added, into contact with the catalyst according to claim 1.

16. The method according to claim 15, wherein the concentration of carbon monoxide in the gases is reduced to 100 ppm or lower at the last.

17. The method according to claim 15, wherein said oxygen is added in the state of air.

18. The method according to claim 15, wherein said oxygen is added such that the molar ratio of $O_2/CO$ is in the range of from 0.5 to 2.5 in the gas to which said oxygen has been added.

19. The method according to claim 15, wherein said oxygen is added such that the molar ratio of $O_2/CO$ is in the range of from 0.7 to 1.5 in the gas to which said oxygen has been added.

20. The method according to claim 15, wherein said gas to which the oxygen has been added is brought into contact with said catalyst at a temperature of from 60° C. to 220° C. and at a gas hourly space velocity (GHSV) ranging from 5,000/hr to 150,000/hr.

21. The method according to claim 15, wherein the concentration of carbon monoxide in the gas is reduced to 100 ppm or lower.

* * * * *